US008763125B1

(12) United States Patent
Feng

(10) Patent No.: US 8,763,125 B1
(45) Date of Patent: Jun. 24, 2014

(54) DISABLING EXECUTION OF MALWARE HAVING A SELF-DEFENSE MECHANISM

(75) Inventor: Hsiang-an Feng, Taipei (TW)

(73) Assignee: Trend Micro, Inc., Tokyo (JP)

( * ) Notice: Subject to any disclaimer, the term of this patent is extended or adjusted under 35 U.S.C. 154(b) by 858 days.

(21) Appl. No.: 12/238,606

(22) Filed: Sep. 26, 2008

(51) Int. Cl.
G06F 11/00 (2006.01)
G06F 12/14 (2006.01)
G06F 12/16 (2006.01)
G08B 23/00 (2006.01)
G06F 17/30 (2006.01)
G06F 7/04 (2006.01)
H04N 7/16 (2011.01)
G06F 9/44 (2006.01)

(52) U.S. Cl.
USPC ............. 726/24; 726/22; 726/26; 713/175; 717/127; 717/110

(58) Field of Classification Search
USPC .............. 709/206; 713/187–188; 723/22–26; 726/22–26, 187–188
See application file for complete search history.

(56) References Cited

U.S. PATENT DOCUMENTS

| 6,006,328 | A * | 12/1999 | Drake | 726/23 |
| 2007/0234430 | A1 * | 10/2007 | Goldsmid et al. | 726/26 |
| 2008/0060072 | A1 * | 3/2008 | Saito et al. | 726/22 |
| 2008/0184198 | A1 * | 7/2008 | Sabella et al. | 717/110 |
| 2009/0077383 | A1 * | 3/2009 | de Monseignat et al. | 713/175 |
| 2010/0005291 | A1 * | 1/2010 | Hulten et al. | 713/156 |

OTHER PUBLICATIONS

Michael Lesk et al., Software Protection through Anti-Debugging, 2007, IEEE, p. 82-84.*
Shevchenko, Alisa; "The evolution of self-defense technologies in malware"; Jun. 29, 2007; Temporary Internet Files/OLK22/070625_Shevchenko_evolution_self-defense_eng.doc.
Ferrie, Peter; "Anti-Unpacking techniques"; Microsoft Malware Protection Center; Threat Research and Response; May 1, 2008.

* cited by examiner

Primary Examiner — Evans Desrosiers
(74) Attorney, Agent, or Firm — Beyer Law Group LLP

(57) ABSTRACT

A dummy debugger program is installed within the user computer system. The dummy program is registered with the operating system as a debugger and may also be registered as a system service as if it is a kernel mode debugger. The dummy debugger program may have the name of a popular debugging program. Dummy registry keys are created that are typically used by a debugger to make it appear as if a debugger is present within the operating system of the user computer. Dummy program folders or dummy program names are created to make it appear as if a debugger is present within the operating system of the user computer. API calls are intercepted by using API hooks and modified to always return a meaningful value indicating that a debugger is present. Malware performing any checks to see if a debugger is present will be informed that a debugger is present and will then shutdown, sleep, terminate, etc. Or, in order to trick malware into thinking that an emulator is present, any API call is intercepted and the sleep time passed in is raised by a couple of milliseconds. Malware will determine that the time parameter passed in is not equivalent to the elapsed time from before the API call to after the call and the malware will determine that an emulator is present and will terminate.

16 Claims, 3 Drawing Sheets

User Computer Environment

DISABLING EXECUTION OF MALWARE HAVING A SELF-DEFENSE MECHANISM

FIELD OF THE INVENTION

The present invention relates generally to disabling malware in a computer system. More specifically, the present invention relates to disabling malware by using the malware's own self-defense mechanism.

BACKGROUND OF THE INVENTION

Computer systems these days run the risk of being infected by malware and having that malware disrupt the computer system or destroy data among other unwelcome behavior. Malware includes computer viruses, worms, root kits, etc. that disrupt and cause damage.

Traditional malware prevention technologies use either pattern matching (including virus signatures) to detect a malware file and to block specific files from running, or use behavior-based rules and policies to detect specific activities and then to block the processes and files causing those activities. A drawback of such approaches, though, is the requirement to continuously update virus patterns, rules and policies regularly. Another disadvantage, which is the biggest concern of users, is the high consumption of computer system resources and the decrease in computer system performance.

It is realized that most malware today uses some kind of self-defense mechanism, and these techniques can be classified in a variety of ways. Some of these techniques are used to bypass virus signature scanning, while others are meant to simply hinder any analysis of the malicious code in a malware file. A malicious program may attempt to conceal itself in the computer system, while another will choose instead to search for and counter specific types of antivirus protection. In general, malware self-defense techniques range from passive to active, and from targeted to general. These techniques include: blocking files as a countermeasure against file scanning; modifying the "hosts" file in order to block access to antivirus update sites; hindering detection of a virus that uses signature-based methods; preventing analysis of the virus code by an engineer; hindering detection of a malicious program in the computer system; and searching for and hindering the functionality of security software such as firewalls.

Given the importance of detecting and preventing malware from operating within a computer system, and the drawbacks of traditional technologies such as pattern matching and behavior matching, further techniques are desired to disable malware.

SUMMARY OF THE INVENTION

To achieve the foregoing, and in accordance with the purpose of the present invention, a malware disabling technique is disclosed that makes use of the malware's own self-defense mechanism.

In general, the present invention prevents malicious code from executing without the need for pattern matching, virus signatures, or behavior-based rules and policies. The present invention provides a quick and simple way to offer additional protection against malicious code execution.

In one embodiment, any of a variety of debugger-related API functions are hooked (or intercepted) and modified to return a value that indicates that a debugger is present within an end-user computer system. Or, a dummy-debugger program is created and installed as a debugger driver in the computer system. Or, any of a variety of dummy debugger data (such as fake folders, fake names and fake registry keys) are placed within the computer system to indicate that a debugger is present. Malware that uses its self-defense mechanism to determine if a debugger is present will automatically terminate, sleep or perform an innocuous activity when it believes that a debugger is present.

In a second embodiment, typical API functions (such as Sleep) used by malware to determine elapsed time are modified. The functions are modified such that the function takes slightly longer than the malware would expect, thus tricking the malware into thinking that an emulator is present. The malware will then terminate or sleep because it believes an emulator is present.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
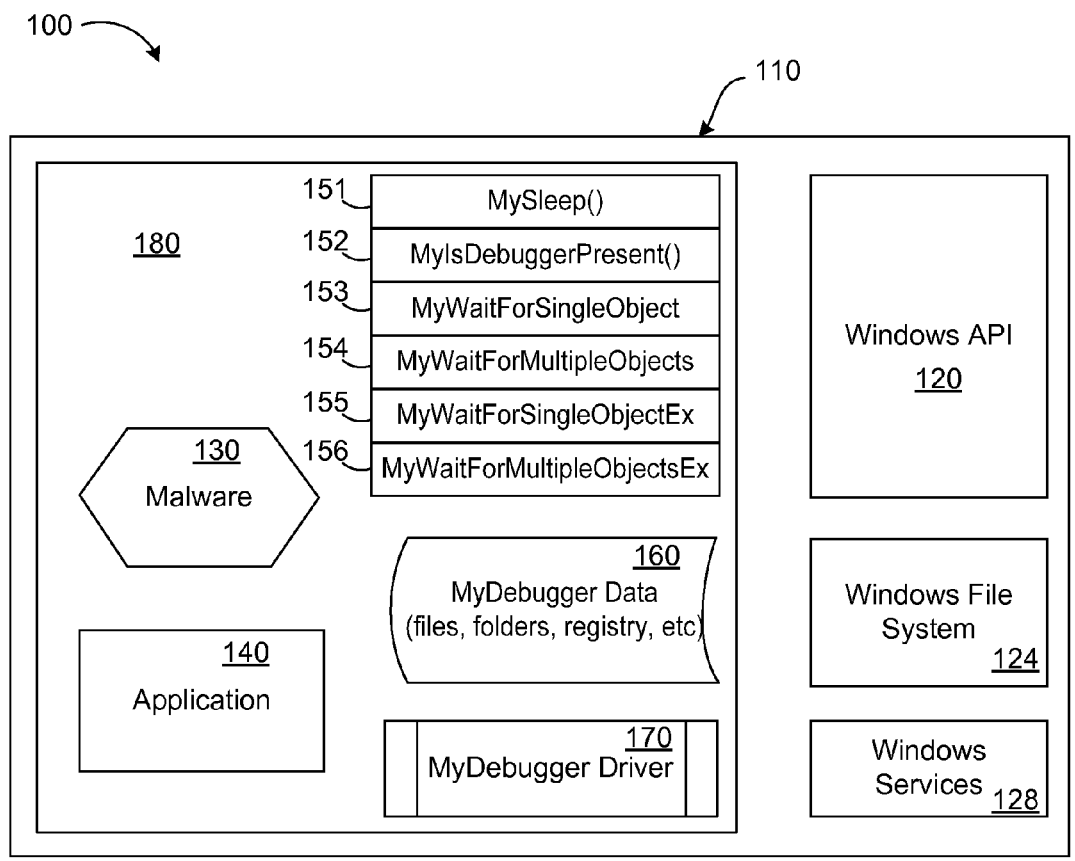
FIG. 1 is an example user computer system environment useful with the present invention.

As mentioned above, it is known that many types of malware use a self-defense mechanism to prevent detection and disabling of the malware. The present invention takes advantage of this fact. Among the many self-defense techniques used by malware are the anti-debug and anti-emulation techniques. These techniques are used to make it more difficult for an engineer to analyze malware, and to make it more difficult for a scanner to detect malware using an emulator. It is realized that knowledge of these techniques may be utilized to craft an effective malware disabling strategy.

To implement these techniques, malware may include an anti-debug trap and an anti-emulator trap; these traps let the malware know when a debugger or emulator is being used by an engineer to detect or disable the malware. Normally, an emulator in a malware scanner needs to successfully bypass the anti-debug and anti-emulation traps in order to reveal a buffer for scanning or to perform behavior analysis. Behavior-based protection techniques also require the malware to run without triggering the anti-debug and anti-emulation traps. In other words, the malware needs to run so it can be analyzed. When the anti-debug or the anti-emulator trap is triggered, the malware will typically terminate its execution in order to avoid being detected or analyzed.

When protecting computer system users from malware using signature-based or behavior-based techniques, it can be necessary to handle the anti-debug and anti-emulator traps so that the malicious code can run. On the other hand, it is realized that one may simply trigger the anti-debug and anti-emulator traps so that the malicious code would not execute at all. Certainly, not having the malicious code run at all is a desirable goal. Such traps may be triggered by pretending that a debugger or emulator is present in the computer system. By creating the illusion that the malicious program is being debugged will cause the self-defense mechanism to terminate the malware. Because there are a great many malicious programs that incorporate anti-debug and anti-emulator traps, faking the presence of a debugger or emulator can easily prevent such malicious programs from executing.

Debugger Overview and Technique

Useful to an understanding of the present invention is a review of anti-debugger and anti-emulator traps used by malware. It is to the benefit of malicious code writers to prevent an engineer (such as a malware researcher in a laboratory) to be able to detect, analyze and understand a malware program. Once the existence of a malware program is confirmed and its operation analyzed, a virus signature for that malware may be generated and then distributed to antivirus software packages as part of a pattern update. If an engineer cannot detect and see the malware in operation, it is very difficult to produce a virus signature for that malware. Typically, a debugger program (such as "Win Debug" or "Turbo Debug") is used to analyze or reverse engineer malware code by disassembly of the machine code into human-readable assembly language. The malicious code may then be traced and understood. The malware, of course, tries to hide from the malware researcher by using anti-debugger traps.

Generally, malware uses a variety of ways to detect the existence of a debugging program and to hide from that debugging program. There are two basic types of debuggers, a "user mode" debugger and a "kernel mode" debugger. User mode debuggers have limited use in that they may only debug other user mode programs and cannot see other system activities. They register in an operating system as a debugger but not as a system service. On the other hand, a kernel mode debugger is much more powerful and has access to all system events and information in order to trace most any activity. Kernel mode debuggers must register as a system service, for example, with the Microsoft operating system kernel and are known as kernel mode drivers. Malware is able to ask which system services are running and can thus determined that a kernel mode debugger is operating within the computer system. Because kernel mode debuggers are normally only used by software engineers or malware researchers, and not on normal user computers, existence of a kernel mode debugger tells the malware that it is not on the user computer, it is likely being analyzed, and it might be a good time to shut down.

The malware first checks if the operating system environment in which it is operating has a debugger present and there are a variety of ways to do this. One way is for the malware to make an API call to a routine such as "IsDebuggerPresent" which will return true if a debugger is running in the operating system. Or, a call to "GetDebuggerFlag" returns the debugger flag if a debugger is present; a null result tells the malware that no debugger is present. There are other APIs that may be called by the malware that would return a meaningful value if a debugger is present. Malware may also search the list of loaded drivers to look for a popular debugger by name. Alternatively, the malware may look in the program files for a folder having the name of any of a variety of popular debuggers, or look for a key in the registry keys that are typically used by debuggers. Next, the malware tries to hide itself by perhaps doing something normal, doing nothing, exiting normally, or executing a sleep routine and then checking for the debugger again later.

A variety of techniques may be used to take advantage of this knowledge of what the malware is doing and to thus prevent it from executing. A first technique involves installing a dummy debugger program within the user computer system. Any simple dummy program is written that performs a simple, nonintrusive function, or performs no function at all. This dummy program is registered with the operating system as a debugger and may also be registered as a system service as if it is a kernel mode debugger. This dummy program will automatically begin running and be present in the list of system services upon reboot and will thus appear to the malware as if a debugger is present. Because the dummy program does nothing, it will have minimal impact upon the operating system performance. Any malware thus performing any of the above checks to see if a debugger is present will be informed that a debugger is present and will then shutdown, sleep, terminate, etc. as described above. While the dummy debugger may be presented as a user mode debugger, it is preferable to present itself as a kernel mode debugger. Thus, this technique prevents execution of the malware.

A variation on this first technique involves creating a dummy debugger program that actually has the name of a popular debugging program. For malware that searches the list of loaded drivers looking for a debugging program name, this technique will fool that malware into thinking that a debugging program is present on the user computer.

A second technique involves creating dummy registry keys that are typically used by a debugger to make it appear as if a debugger is present within the operating system of the user computer. Thus, malware checking for debugger registry keys will find the dummy keys and will terminate because it believes a debugger is present. As an example, the debugger "Win Debug" creates the registry subkey: HKEY_CURRENT_USER\Software\Microsoft\Windbg.

A third technique involves creating dummy program folders and/or dummy program names to make it appear as if a debugger is present within the operating system of the user computer. For example, a dummy program folder is created having the name of a popular debugger. Or, a dummy program name having the name of a popular debugger is created and placed within one of the program folders. Or, a dummy program name is created having a popular debugger extension of ".dbg" and placed within one of the program folders. Thus, any malware looking for the existence of debugger by checking the program folders and program names would assume that a debugger is present and would terminate.

A fourth technique involves intercepting the API calls described above by using API hooks. For example, one may intercept the "IsDebuggerPresent" API call in the user computer, and make it always return true. Or, the other API calls described above are intercepted to always return a flag indicating a debugger is present, or to return a meaningful value indicating that a debugger is present. A technique for intercepting an API call or hooking an API is described below.

Emulator Overview and Technique

As known in the art, an emulator is often used in antivirus scanning software to assist in finding and detecting malware for which no virus signatures yet exist. Unlike the debugging techniques above that are used by malware researchers in a controlled laboratory environment to detect and analyze malware, an emulator is typically used within scanning software that is running on the user computer. Because scanning software can only detect malware for which a virus signature already exists, an emulator can assist in identifying malware that has not yet been identified.

In general, an emulator attempts to emulate the operating system environment of the computer system within the process of the scanning software in order to make the malware think that it is executing upon the actual computer system, when actually it is executing within the controlled environment of the scanning software. Malware executing within an emulator might think it is accessing the actual CPU, RAM and disk of the computer system, but the malware is actually executing within the virtual world of the emulator where the real computer system will not be affected by execution of the malware. For example, if the malware executes a command to "Format C: Drive" the actual physical drive will not be formatted because only the emulator receives and acts upon this command.

An emulator uses behavior-based monitoring to look for harmful behavior that malware is producing. For example, the following harmful behavior is identified: delete files, format drive, inject into DLL, hook APIs, infect files, any root kit behavior, API injection, writing auto run registry keys, uninstalling and antivirus program, killing other processes, downloading an executable program, etc. Any of this type of behavior will indicate to the emulator that the process causing this activity is likely to be malware.

Similar to the presence of a debugging program within a computer system, presence of an emulator indicates to the malware that scanning or other software is present and the malware will likely terminate. One technique that malware uses to detect if an emulator is present (i.e., to detect if the malware is actually executing within an emulator and not within the actual computer system) is to check the time it takes to perform an operation or a sequence of operations. While a real CPU will execute operations extremely quickly, an emulator will be relatively slower because it must pass these operations to the CPU and back, and then pretend that it itself is executing the operations. Malware knows this and will often check the system time before and after a sequence of operations to see how long they have taken. A relatively large time (or an abnormal amount of time for the type of operation) will indicate to the malware that it is operating inside of an emulator, and the malware will likely terminate.

Accordingly, one technique used to fool malware into thinking that an emulator is present is to make certain operations take longer. Malware often checks the system time before and after a variety of API calls to determine how much time has passed. For example, malware may call "GetTickCount" before and after a "Sleep" API call, and then check the difference between the two "GetTickCount" calls. The malware passes a parameter in milliseconds to the "Sleep" call and then checks if the elapsed time is the same as the parameter input. Other typical APIs calls used by malware to check the length of time is "WaitForSingleObject" or "WaitForMultipleObjects." These API calls allow a parameter to be passed in setting a maximum time limit to wait.

In order to fool malware into thinking that an emulator is present, we intercept the "Sleep" API call (or other similar API call) and raise the sleep time passed in as the argument by a couple of milliseconds. This minuscule increase in time will be unnoticeable to the user but will be noticed by the malware. For example, if the input parameter to the "Sleep" call is 200 ms, that value may be increased by 5%. Malware will determine that the time parameter passed in is not equivalent to the elapsed time from before the API call to after the call and the malware will determine that an emulator is present and will likely terminate.

Computer Environment Block Diagram

FIG. 1 illustrates an example user computer system environment 100 useful with the present invention. The techniques described above may be used with any suitable hardware computer system and may result in any number of environment configurations such as environment 100. As discussed above, the techniques are implemented on an end-user computer in which it is desirable to disable execution of malware. Environment 100 shows only the software aspects of this environment; hardware features are not shown.

Typical operating system software features are shown at 120-128. Of course, other different types of operating systems may also be used in place of a Microsoft operating system. Malware 130 is any of a variety of types of malware having a self-defense mechanism that is present on the end-user computer; it is this malware that an aspect of the present invention will attempt to disable. Application 140 is any typical software application presence on the user computer.

Shown at 151-156 are any number of API hooks (or function calls) that have been written to hook or intercept standard function calls or APIs within the normal operating system. These functions 151-156 are dummy functions in that in addition to the regular function call (or instead of), these functions have no real purpose aside from tricking the malware into thinking that a debugger or emulator is present. For example, when malware 130 calls the function "Sleep," it is actually the function "MySleep" that is called and that increases the sleep time slightly so as to fool the malware into thinking that an emulator is present. The function "MySleep" also calls the real function "Sleep."

As discussed above, function 152 fools the malware into thinking that a debugger is present by always returning "True." Functions 153-156 fool malware into thinking that an emulator is present by also slightly incrementing the elapsed time. These dummy functions are one example of how an API call may be intercepted. In these examples, the traditional API call is intercepted and handled by one of dummy functions 151-156 which may in turn end up calling the real function in the course of executing the dummy function.

Data 160 indicates the dummy files, dummy folders, dummy registry keys, etc. that may be set up within the user computer environment in order to fool the malware into thinking that a debugger is present within the system. Driver 170 is an example of a dummy kernel mode debugger program that has been set up within the system. Once registered, its name "MyDebugger" will be added to the system services 128. Malware checking the list of system services will recognize that a debugger is present and will likely terminate.

Of course, all software (whether malware or legitimate applications) present within microenvironment 180 will have access to functions 151-156, data and 160 and drivers 170. This means that not only will malware encounter these functions, data and drivers, but also all legitimate applications will as well. Normal applications will not be affected since they are not normally looking for debugger type data or programs, nor calling functions 151-156. Even if they do call these dummy functions the effect upon the legitimate application will be negligible.

API Hooking Example

Figures 2, 3:
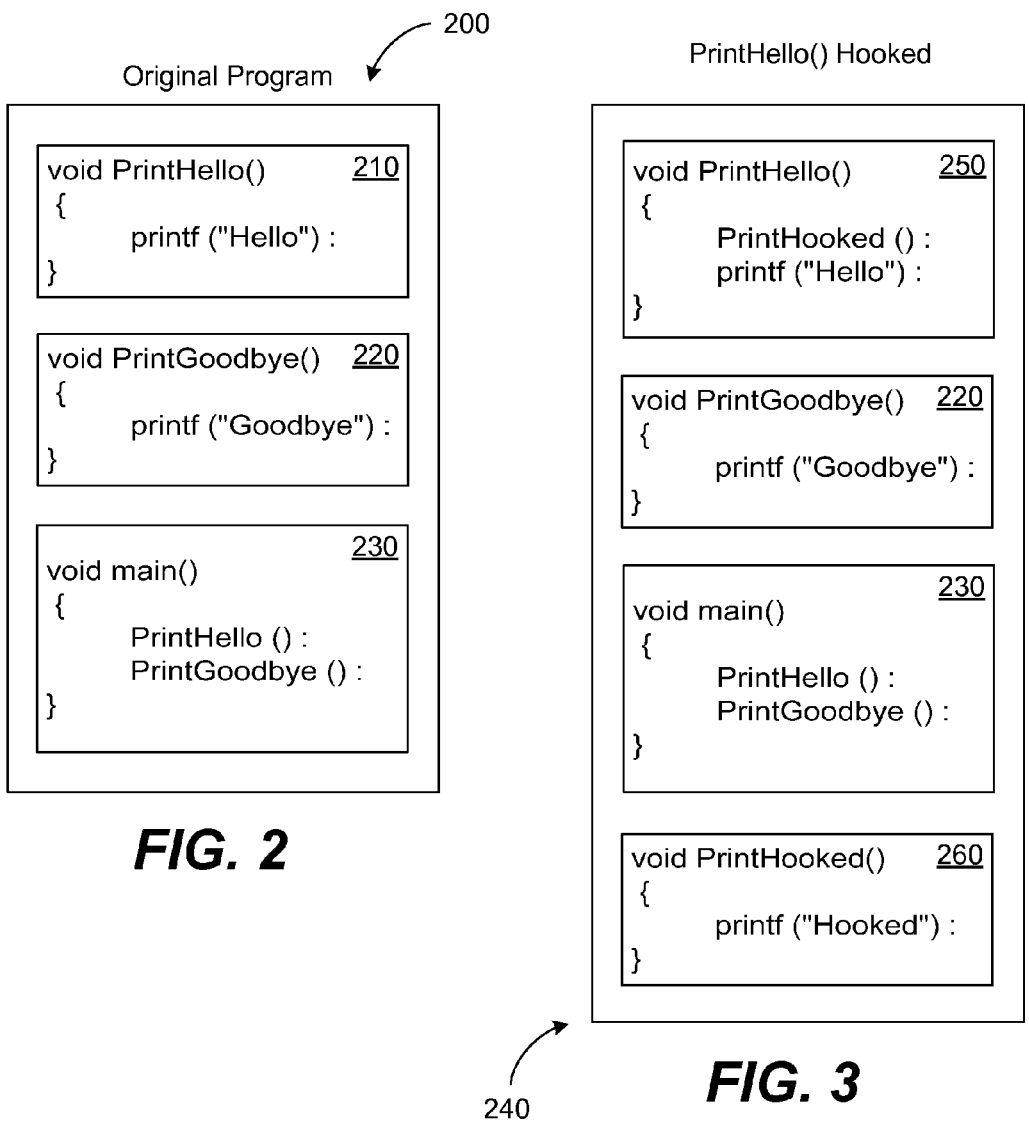
FIG. 2 is a block diagram of an original program having various functions.
FIG. 3 is an example of hooking this original program to produce a hooked version.

FIG. 2 is a block diagram of an original program 200 having functions 210-230. FIG. 3 is an example of hooking this original program to produce a hooked version 240. These figures illustrate an example of API hooking, also known as API hijacking.

As shown in FIG. 2, the original program 200 uses function "Main" 230 to first call PrintHello 210 and then calls PrintGoodbye 220. Thus, running the program 200 outputs two strings, namely "Hello" and "Goodbye."

As shown in the FIG. 3, original program 200 has been modified by hooking to produce modified program 240. We hook PrintHello 250 by inserting an additional function called PrintHooked into it. As a result, whenever PrintHello 250 is called, PrintHooked is also called. Because Print- Hooked is inserted as a first step, the string "Hooked" will get printed before the string "Hello." Thus, running the hooked program 240 will output "Hooked," "Hello," and "Goodbye." In addition, because we have added an additional function call into PrintHello 250 instead of overwriting the original code, we are simply adding more functionality into PrintHello and not completely altering its original behavior. In other words, the original functionality of PrintHello 250 (printing the "Hello" string), is still performed on every PrintHello call. The PrintHello hook simply allows the program 240 to print an additional "Hooked" string, and then returns to PrintHello to let it do its job, which is to print "Hello."

In a similar fashion, one may hook the Sleep API (or any other API) which takes as input an integer parameter in milliseconds. One inserts a hook as similar to that done above for PrintHello. In this hook, we simply increment the input parameter, and then return to the Sleep API to let it do its job. As an example, one may simply insert "msec++" into Sleep( ) to make it sleep longer than requested. Here is an example of the pseudocode:

```
Sleep(int msec)
{
  msec++;
  // original Sleep( ) code
}
```

By performing this simple increment of the input value, one may fool malware that is expecting "Sleep" to wake up after an exact time interval. The malware will then think that an emulator is present.

Computer System Hardware Embodiment

Figure 4A:
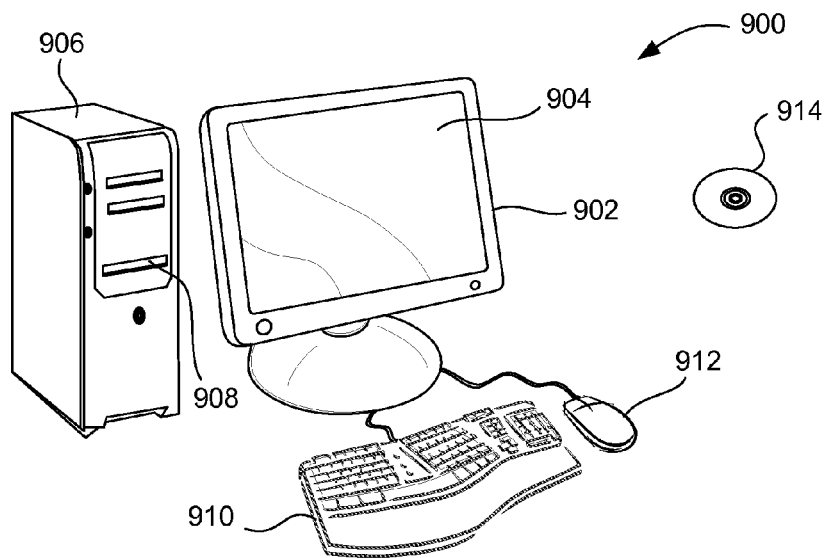
FIGS. 4A and 4B illustrate a computer system suitable for implementing embodiments of the present invention.
Figure 4B:
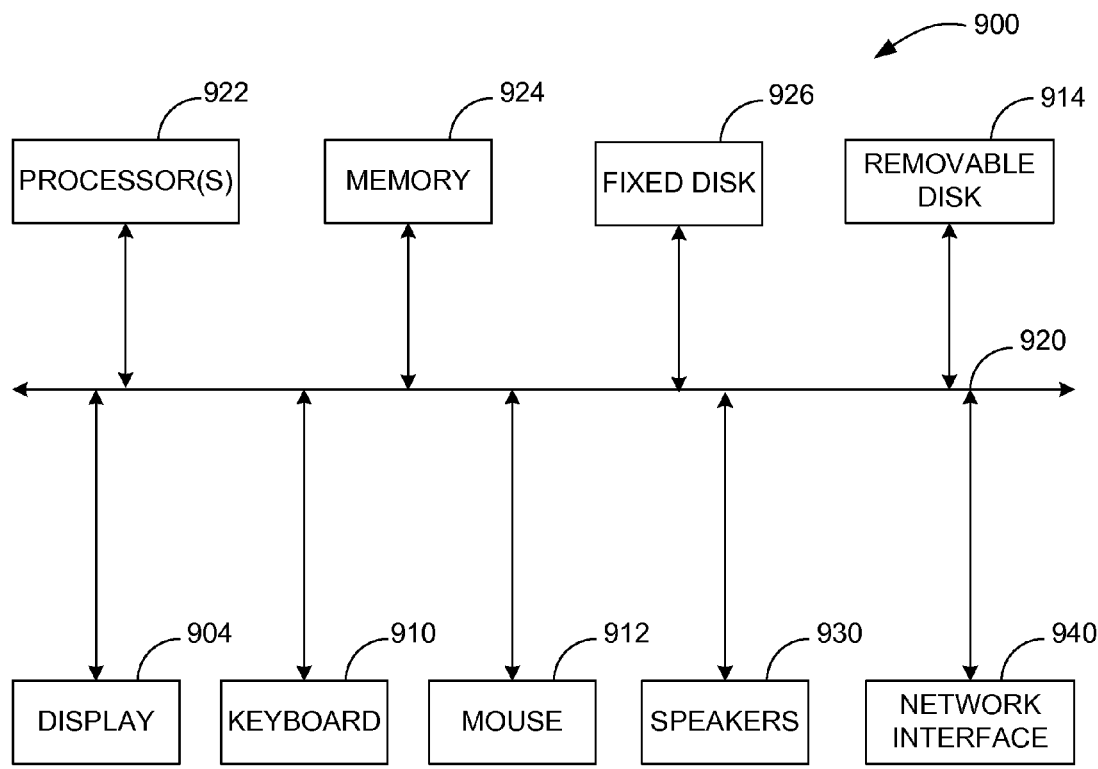

FIGS. 4A and 4B illustrate a computer system 900 suitable for implementing embodiments of the present invention. FIG. 4A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 4B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of disabling malware in a computer system, said method comprising:
   modifying source code of a system function in said computer system to effect a result that indicates that a debugger program is present in said computer system, wherein said computer system does not include a running debugger program or a dummy debugger program;
   calling said system function of said computer system by a malware program with the purpose of determining whether or not a debugger program is present in said computer system;
   calling, by said system function, a dummy function that has no real purpose other than tricking said malware program into determining that a debugger program is present in said computer system, wherein said result produced by said system function is to return a value to said malware program indicating that a debugger program is present within said computer system;
   said system function producing said result that indicates to said malware program that a debugger program is present in said computer system; and
   said malware program taking an action that causes said malware program not to perform its function of harming said computer system.

2. A method as recited in claim 1 wherein said result produced by said system function is to delay execution of said system function, and wherein said result indicates to said application program that said debugger program is present in said computer system.

3. A method as recited in claim 1 wherein said system function is an API function of said computer system.

4. A method as recited in claim 1 wherein said taking an action includes terminating said application program, putting said application program to sleep, performing an activity does that does not harm said computer system, or performing no activity.

5. A method of disabling malware in a computer system, said method comprising:
- creating a dummy debugger program that performs no debugging activity;
- installing said dummy debugger program as a debugger program in said computer system as a kernel mode driver, said computer system not including a running debugger program, and wherein a name of said installed dummy debugger program is the same name as a real debugger program;
- registering said dummy debugger program as a debugger with an operating system of said computer system;
- executing said dummy debugger program in said computer system;
- determining, by a malware program, whether a debugger program is installed in said computer system, said malware program determining that a debugger program is installed in said computer system by virtue of said installed and executing dummy debugger program;
- said malware program taking an action that causes said malware program not to perform its function of harming said computer system.

6. A method as recited in claim 5 wherein said dummy debugger program is installed as a user mode driver.

7. A method as recited in claim 5 wherein said taking an action includes terminating said application program, putting said application program to sleep, performing an activity does that does not harm said computer system, or performing no activity.

8. A method of disabling malware in a computer system, said method comprising:
- creating dummy debugger data for a debugger program that does not exist, said computer system not including a running debugger program or a dummy debugger program;
- inserting said dummy debugger data in a file system within said computer system, wherein said dummy debugger data is a file name reflecting the name of a debugger program;
- determining, by a malware program, whether any debugger program is installed in said computer system, said malware program determining that a debugger program is installed in said computer system by virtue of finding said dummy debugger data;
- said malware program taking an action that causes said malware program not to perform its function of harming said computer system.

9. A method as recited in claim 8 wherein said dummy debugger data is a registry key typically used by a debugger program and said suitable location is a registry of said computer system.

10. A method as recited in claim 8 wherein said dummy debugger data is a folder name reflecting the name of a debugger program and said suitable location is a file system of said computer system.

11. A method as recited in claim 8 wherein said dummy debugger data is a file name reflecting the name of a debugger program and said suitable location is a file system of said computer system.

12. A method as recited in claim 8 wherein said taking an action includes terminating said application program, putting said application program to sleep, performing an activity does that does not harm said computer system, or performing no activity.

13. A method of disabling malware in a computer system, said method comprising:
- modifying source code of a system function in said computer system to effect a result that indicates that an emulator program is present in said computer system, wherein said computer system does not include a running emulator program or a dummy emulator program;
- calling said system function of said computer system by a malware program with the purpose of determining whether or not said emulator program is present in said computer system;
- calling, by said system function, a dummy function that has no real purpose other than tricking said malware program into determining that an emulator program is present in said computer system by delaying execution of said system function;
- said system function producing said result that indicates to said malware program that an emulator program is present in said computer system; and
- said malware program taking an action that causes said malware program not to perform its function of harming said computer system.

14. A method as recited in claim 13 wherein said result produced by said system function is to return a value to said application program indicating that said emulator program is present within said computer system.

15. A method as recited in claim 13 wherein said system function is an API function of said computer system.

16. A method as recited in claim 13 wherein said taking an action includes terminating said application program, putting said application program to sleep, performing an activity does that does not harm said computer system, or performing no activity.

* * * * *